Aug. 7, 1934.    W. C. HEDGCOCK ET AL    1,969,131
TRUCK BOLSTER
Filed Oct. 30, 1929    3 Sheets-Sheet 1
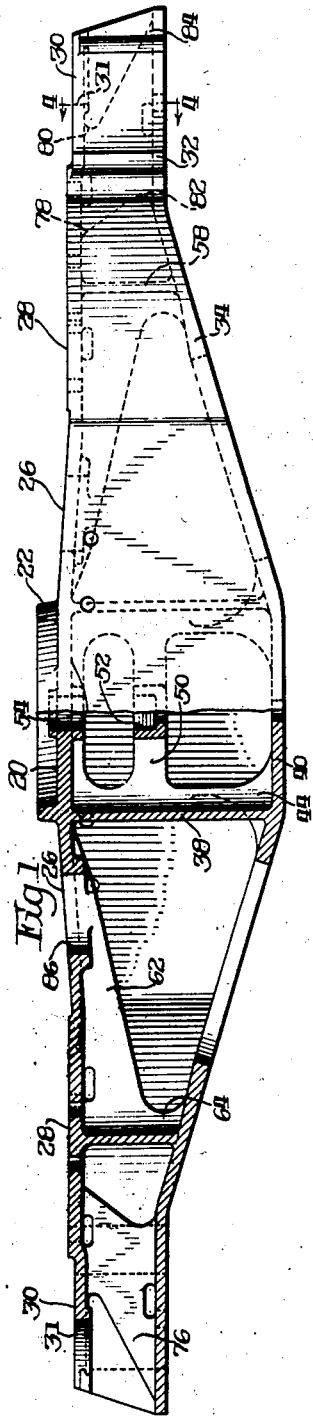
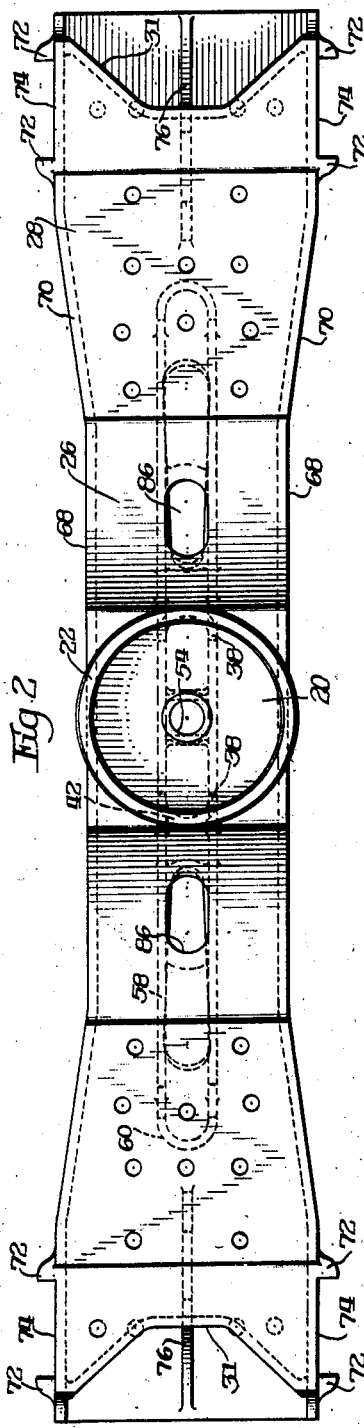
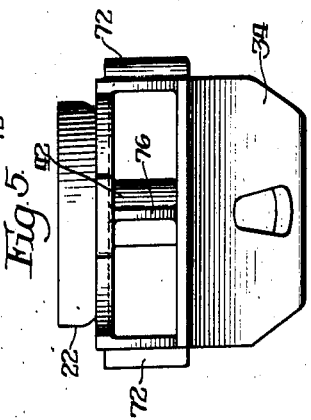
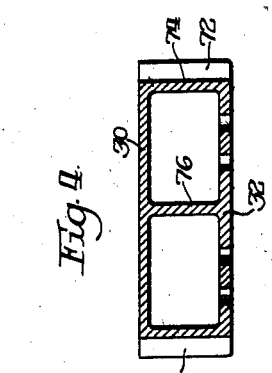
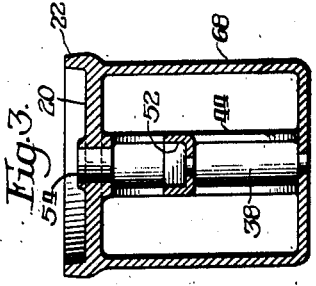
Inventors
William C. Hedgcock.
Robert B. Cottrell.

Aug. 7, 1934.     W. C. HEDGCOCK ET AL     1,969,131
TRUCK BOLSTER
Filed Oct. 30, 1929     3 Sheets-Sheet 2
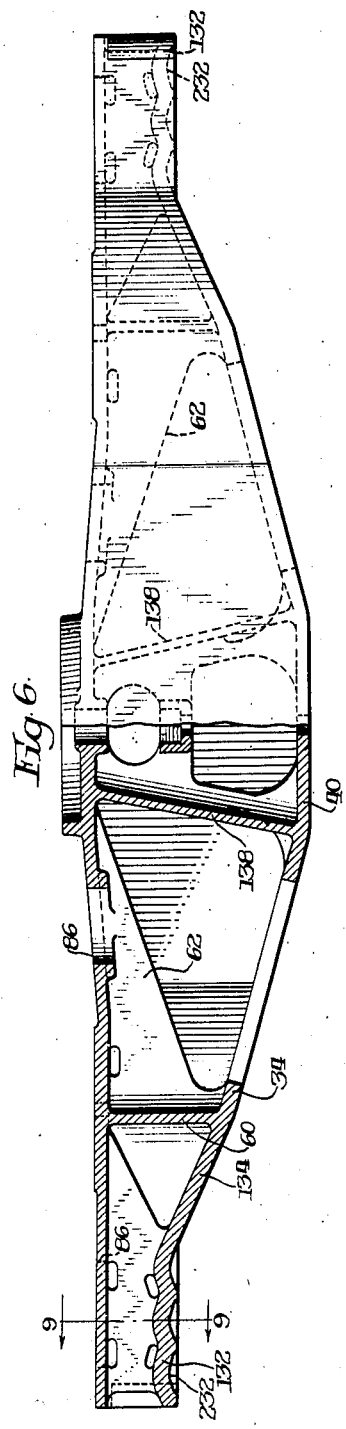
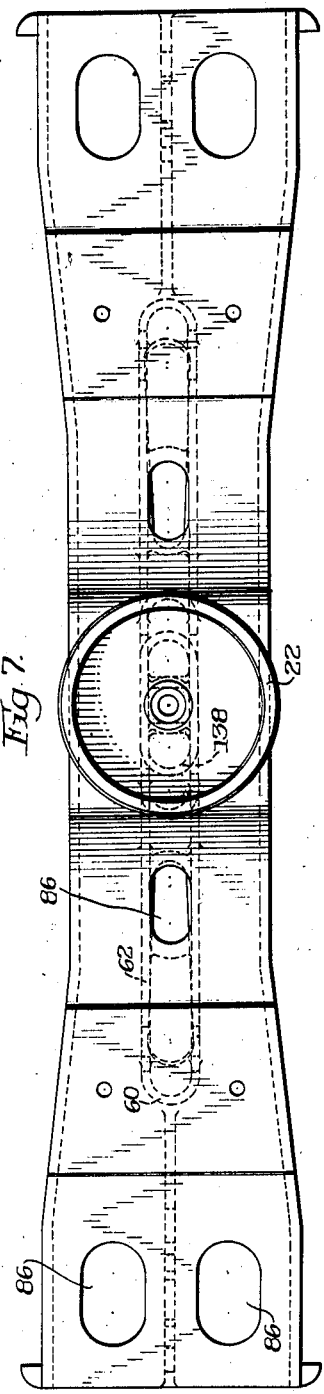
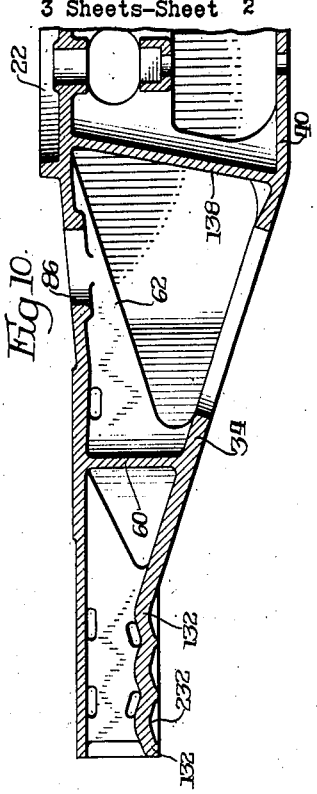
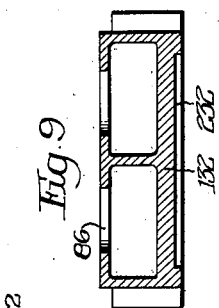
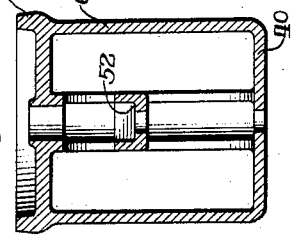
Inventors
William C. Hedgcock
Robert B. Cottrell Aug. 7, 1934.　　W. C. HEDGCOCK ET AL　　1,969,131
TRUCK BOLSTER
Filed Oct. 30, 1929　　3 Sheets-Sheet 3
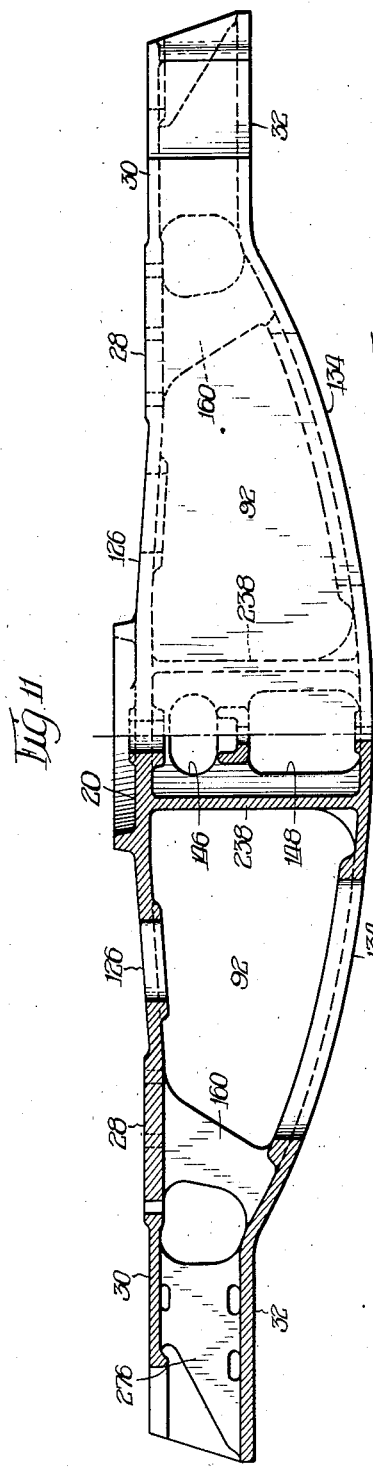
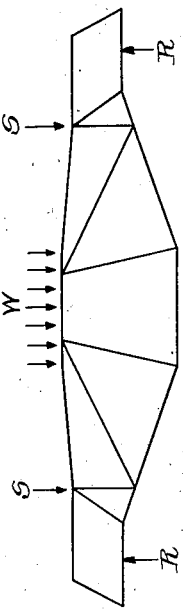
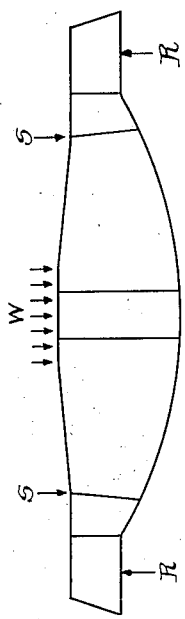
Inventors:
William C. Hedgcock,
Robert B. Cottrell, Patented Aug. 7, 1934

1,969,131

UNITED STATES PATENT OFFICE 1,969,131

TRUCK BOLSTER

William C. Hedgcock, Wilmette, and Robert B. Cottrell, Chicago, Ill., assignors to American Steel Foundries, Chicago, Ill., a corporation of New Jersey Application October 30, 1929, Serial No. 403,389

53 Claims. (Cl. 105—230)

This invention pertains to bolsters, and more particularly to cast steel truck bolsters.

The usual design of truck bolster as now generally made, is substantially a hollow box girder with a strut disposed between the top and bottom walls at the center beneath the central part of the center plate and with flat unstiffened vertical ribs connecting the top and bottom walls directly under the side bearings and directly over the spring seats. In many bolsters as now made, the bottom wall or tension member is curved, as viewed transversely of the truck, so as to provide sufficient theoretical girder depth of section at positions between the center plate and the side bearing.

In testing bolsters by applying a vertical load on the center plate, in a testing machine, it is found that the bolster frequently fails from a preliminary collapse or buckling of the top wall between the center plate and side bearing, and that there occurs a straightening out of the bottom wall or tension member in the curved portion thereof. It is also found when testing such a bolster with a vertical load on the side bearing, that the bolster frequently fails due to preliminary buckling of the vertical rib under the side bearings, and also due to collapse of the adjacent top wall.

It is therefore an object of this invention to provide a cast steel bolster which is reenforced against collapsing tendencies in such a manner whereby its ultimate strength is increased.

Another object is to provide a bolster incorporating truss structure principles which fulfills all requirements of practical manufacture and service.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 1 is a side elevation, half in section, of the improved truck bolster;

Figure 2 is a top plan view of the bolster illustrated in Figure 1;

Figure 3 is a transverse sectional elevation through the center bearing;

Figure 4 is a transverse sectional elevation of one end of the bolster, the same being taken substantially in the plane as indicated by the line 4—4 of Figure 1;

Figure 5 is an end elevation of the bolster arrangement illustrated in Figure 1;

Figure 6 is a side elevation, half in section, of a modified form of truck bolster;

Figure 7 is a top plan view of the bolster illustrated in Figure 6;

Figure 8 is a transverse sectional elevation through the center bearing of the modified form of bolster;

Figure 9 is a transverse sectional elevation of one end of the modified bolster, the same being taken substantially in the plane as indicated by the line 9—9 of Figure 6;

Figure 10 is a fragmentary sectional elevation of still another modified form of bolster;

Figure 11 is a side elevation, half in section, of a truck bolster of usual design;

Figure 12 is a diagram of the essential construction of the usual design of bolster as shown in Figure 11;

Figure 13 is a diagram of the essential construction of the improved truck bolster shown in Figure 1;

Figure 14 is a diagram of the essential construction of the improved bolster shown in Figure 10; and Figure 15 is a diagram of the essential construction of the improved bolster shown in Figure 6.

To more clearly indicate the nature of the modifications in the improved bolsters to be subsequently set forth, reference is now made to the usual design of bolster illustrated in Figure 11. This is essentially a hollow box girder having a center plate 20 upon which the weight of the car body is normally carried, side bearings 28 upon either of which a portion or all of the weight of the car body may be occasionally carried, and spring seats 32 upon which the bolster is supported by the carrying springs. For its function as a girder the bolster has a top wall 126 which continues from the center plate 20 to the side bearings 28 and is prolonged as at 30 from the side bearings toward the ends of the bolster, and this entire top wall consisting of portions 20, 126, 28 and 30 is intended to serve as a compression member. The tension member of the girder is provided by the bottom wall 134 which extends between the two spring seats 32, and the compression and tension members are spaced apart by the two side walls 92. For the purpose of providing a reinforcing support for the center plate, and for transmitting some of the center plate load to the bottom or tension member, there is usually a strut member between the top and bottom walls of the bolster beneath the central part of the center plate, and which by the presence of the cored openings 146 and 148 therein partakes of the nature of two posts 238 relatively close together at the center of the bolster. The side bearings are usually reinforced by flat unstiffened ribs 160 which are intended to transmit part of the vertical load from the top to the bottom wall, and the spring seats are reinforced by flat unstiffened vertical ribs 276 which are intended to transmit some of the vertical reaction from the bottom to the top wall. With a vertical load on the center plate 20 the compression member at 126 tends to buckle and the tension member at 134 tends to straighten out in its unsupported portion intermediate the two side walls 92. With a vertical load on the side bearing 28 the unstiffened vertical rib 160 tends to buckle, and the eccentric loading of the girder tends to cause a collapse of the adjacent top wall 126.

The diagram in Figure 12 of the usual construction illustrated in Figure 11 shows at R the points of support for the bolster on the spring seats, at W the position of the center plate load, and at S the position of the side bearing load. This diagram also illustrates the mechanical inadequacies of the structure for strength and stiffness under vertical loads, and the lack of through bracing for stiffening the bolster under an eccentric load concentrated on one side bearing which partially contributes to the collapse of the top wall and of the supporting rib under the side bearing.

Referring now to the improved construction and more particularly to the modification illustrated in Figures 1 to 5 inclusive, the bolster is of general box girder shape in section as illustrated particularly in Figures 3 and 4, and includes the center plate 20, shown as defined by substantially circular rim 22, and has side bearings 28 and spring seats 32 all in the usual manner. The top wall of the bolster comprising center plate 20, the portions 26 between center plate and side bearings, the side bearings 28 and the prolongations 30 toward the ends of the bolster, serve as the compression member. The bottom wall of the bolster serves as the tension member and comprises the substantially straight and horizontal central portion 40 extending between the bases of the struts 38, continuing in the substantially straight diagonal portions 34 and merging into the horizontal spring seats 32. The struts 38 are spaced at a relatively greater distance apart than is usual, each being vertically disposed in a position substantially beneath the edge of the center plate 20 and extending from the top wall to the bottom wall of the bolster. The struts 38 are of substantially semi-circular section at their outer edges as at 42 with inwardly extending flanges 44 and are connected by portions 50 having a seat 52 for supporting the center pin in alignment with the aperture 54 in the center plate. Beneath each side bearing 28 and extending from the top wall to the bottom wall of the bolster is provided a side bearing brace 58 having a substantially semi-circular end portion 60 and with flanges 64 which merge into the upwardly sloping brace members 62 which merge into the compression member 26 adjacent the struts 38. The ends of the bolster are provided with vertical ribs 76 extending from points 78 under the side bearing and points 80 toward the ends of the top members 30, diagonally downward to points substantially adjacent the junction of lower diagonal tension member 34 and horizontal spring seat 32 as shown at 82, and to near the end of the spring seat 32 as shown at 84.

The bolster has the top and bottom walls spaced and connected on each side with substantially vertical side walls 68 and 70 which are provided at their outer ends with the usual column guide faces 74 and column guide flanges 72.

In the modification illustrated in Figures 6 to 9 inclusive, the structure is varied somewhat to meet the requirements where the ends of the bolster are restricted to a shallow depth and to provide a strut construction at the center wherein the struts provide a more central support at their top under the center plate while retaining an extended spacing on the tension member. In this structure the diagonal tension member 34 extends in a substantially straight line from its continuation from horizontal portion 40 to a point directly under the side bearing brace at 60, from which point it continues at a greater angle in a substantially straight line as at 134 to its junction with the spring seat 132. By this means adequate structural depth is retained beneath the side bearing regardless of the shallowness of the bolster above the spring seat. The struts 138 extending between the top wall and the bottom wall of the bolster are spaced at an extended distance apart at their junction with the tension member and sloped upwardly toward each other to a relatively closer spacing under the center plate, thus providing a more centralized support for the center plate. The other features of construction of this bolster are substantially the same as for the structure shown in Figures 1 to 5 inclusive.

The improved bolsters, either as illustrated in Figures 1 to 5 inclusive or in Figures 6 to 9 inclusive, may have internally flanged or beaded lightener holes as at 86 in the top wall and at 36 in the bottom wall as is customary in bolster construction. In this case the brace members 62 may also serve as bead portions for the two longitudinal parallel sides of the hole in the top member.

The diagrams in Figures 13, 14 and 15 illustrating the various modifications of the improved construction show at R the points of support for the bolster and the spring seats, at W the position of the center plate load, and at S the position of the side bearing load. These diagrams illustrate the manner in which the structure is braced for strength and stiffness under vertical loads, which bracing continues through the structure to greatly reinforce it for carrying eccentric load concentrated on one side bearing.

It will be seen that the bottom or tension members follow substantially straight lines from panel point to panel point, thus avoiding the weakness of a curved tension member which tends to straighten out under load. By spreading the struts 38 and 138 apart the length of the horizontal bottom chord at the center is increased and the angle of the diagonal bottom chords is inclined more steeply upward whereby the stresses in the diagonal bottom chords are decreased. In Figures 6 and 10 and diagrams Figures 14 and 15 the desirable effect of the steeper diagonal bottom chords is retained by means of spreading the lower ends of the struts 138 an extended distance apart and at the same time a more centralized support under the center plate load is provided by sloping the struts 138 upwardly closer together to their junction with the center plate. The diagonal or sloping brace members 62, in addition to their function as braces in the truss structure, also serve as ribbed reinforcements for stiffening the top wall 26 against collapse.

Throughout the foregoing description and in the subsequent claims, the term "spring seat" is used to define the portions at the ends of the bolster upon which it is carried regardless of whether the bolster rests directly upon the springs or is carried upon some intervening means, as is indicated on the drawings by that portion of the bolster as at 32, 132 and 232.

Some bolsters are made with separate center plates attached thereto, instead of formed integrally as shown on the drawings. Likewise, in some cases the side bearings are formed integrally with the bolster, and in other cases, seats are provided on the bolster for attachment of separate side bearings. These alternatives do not affect the loading conditions or structural principles involved, and it is to be understood that our construction is not limited thereby.

With the structure shown, it will be seen that the principle of truss formation is closely followed and that suitable stiffening for the top wall is provided, and a structure is obtained which is of long life and adequate strength and stiffness, and it is to be understood that we do not wish to be limited by the exact embodiments of the device shown, which are merely by way of illustration and not limitation, as various and other forms of the device will of course be apparent to those skilled in the art without departing from the spirit of the invention or the scope of the claims.

We claim:

1. In a bolster, the combination of spaced upper and lower members, center and side bearings disposed on said bolster, strut members extending between said upper and lower members and having a portion disposed beneath the periphery of said center bearing, said strut members being spaced inwardly from the vertical planes of the side edges of one of said first named members, and brace members disposed between said upper and lower members and substantially in vertical alignment with said side bearings and connected to a point adjacent said center bearing at said upper member.

2. In a bolster, the combination of spaced upper and lower members, center and side bearings disposed on said bolster, strut members extending between said upper and lower members and having a portion disposed beneath the periphery of said center bearing, said strut members being spaced inwardly from the vertical planes of the side edges of one of said first named members, and brace members disposed between said upper and lower members and substantially in vertical alignment with said side bearings and connected to a point adjacent said center bearing at said upper member, said strut members being substantially semi-circular in section and spaced from the side of said bolster.

3. In a bolster having a center bearing, side bearings spaced therefrom, the combination of upper, lower and side members forming a substantial box girder construction, strut members extending between said upper and lower members substantially beneath the periphery of said center bearing, and brace members substantially semi-circular in section extending between said upper and lower members substantially beneath said side bearings.

4. In a bolster having a center bearing, side bearings spaced therefrom, the combination of upper, lower and side members forming a substantial box girder construction, a strut member extending between said upper and lower members substantially beneath said center bearing, brace members extending between said upper and lower members substantially beneath said side bearings, said last named brace members having portions extending inwardly to points adjacent the periphery of said center bearing.

5. In a bolster having a center bearing, side bearings spaced therefrom, the combination of upper, lower and side members forming a substantial box girder construction, a strut member extending between said upper and lower members substantially beneath said center bearing, brace members extending between said upper and lower members substantially beneath said side bearings, said last named brace members having portions extending to points adjacent said strut member.

6. In a bolster having a center bearing, side bearings spaced therefrom, the combination of upper, lower and side members forming a substantial box girder construction, a strut member extending between said upper and lower members substantially beneath said center bearing, brace members extending between said upper and lower members substantially beneath said side bearings, said last named brace members having portions extending diagonally upward to points on said upper member adjacent the periphery of said center bearing.

7. In a bolster having a center bearing and side bearings, the combination of upper, lower and side members forming a substantial box girder construction, brace members substantially semi-circular in section extending between said upper and lower members substantially beneath said side bearings, said brace members having portions extending inwardly to points adjacent the periphery of said center bearing.

8. In a bolster having a center bearing and a side bearing, the combination of upper, lower and side members forming a substantial box girder construction, and a rib formed integral with said upper member on each side of said center bearing, said rib extending from a point adjacent said side bearing to a point adjacent said center bearing.

9. In a bolster having a center bearing and side bearings, the combination of upper, lower and side members forming a substantial box girder construction, spaced ribs formed integral with said upper member on each side of said center bearing and extending from points adjacent said side bearings to points adjacent said center bearing, and an opening in said upper member between said spaced ribs.

10. In a bolster having a center bearing and side bearings, the combination of upper, lower and side members forming a substantial box girder construction, spaced ribs formed integral with said upper member on each side of said center bearing, said spaced ribs extending from near said center bearing to beneath said side bearing, and said spaced ribs converging and joining beneath said side bearing.

11. In a bolster having a center bearing and side bearings, the combination of upper, lower and side members forming a substantial box girder construction, spaced ribs formed integral with said upper member on each side of said center bearing and extending from near said center bearing to beneath said side bearings, said ribs being joined beneath said side bearings by a brace member extending between said upper and lower members.

12. In a bolster having a center bearing, side bearings and spring seats, the combination of spaced upper and lower members, said lower member having a straight horizontal portion substantially below said center bearing, and diagonally extending portions extending to and merging into said spring seat portions, strut portions extending between said upper and lower members substantially beneath said center bearing, and brace members extending between said upper and lower members substantially beneath said side bearings, said latter named brace members being substantially semi-circular in section.

13. In a bolster having a center bearing, side bearings and spring seats, the combination of upper, lower and side members forming a substantial box girder construction, said lower member including a straight horizontal portion substantially below said center bearing and straight diagonally extending portions extending to and merging into said spring seat portions, and ribs formed integral with said upper member on each side of said center bearing and extending from near said side bearing to near said center bearing.

14. In a bolster having a center bearing, side bearings and spring seats, the combination of upper, lower and side members forming a substantial box girder construction, said lower member including a straight horizontal portion substantially below said center bearing and straight diagonally extending portions extending to and merging into said spring seat portions, brace members extending between said upper and lower members substantially beneath said side bearings, and ribs formed integral with said upper member and with said brace members and extending to points adjacent said center bearing.

15. In a bolster having a center bearing, side bearings and spring seats, the combination of upper, lower and side members forming a substantial box girder construction, said lower member including a horizontal straight portion substantially below said center bearing, and diagonally extending portions extending to and merging into said spring seat portions, and brace members extending between said upper and lower members substantially beneath said side bearings, said brace members being substantially semi-circular in section and having rib portions extending therefrom to points adjacent said center bearing.

16. In a bolster having a center bearing, side bearings and spring seats, the combination of upper, lower and side members forming a substantial box girder construction, said lower member including a horizontal substantially straight portion substantially below said center bearing, and diagonally extending portions extending to and merging into said spring seat portions, strut members extending between said upper and lower members from beneath said center bearing to points substantially at the junction of the diagonal and horizontal central portions of said lower member, and brace members extending between said upper and lower members substantially beneath said side bearings, said latter named brace members being substantially semi-circular in section.

17. In a bolster having a center bearing, side bearings and spring seats, the combination of upper, lower and side members forming a substantial box girder construction, said lower member including a horizontal straight portion substantially below said center bearing, and straight diagonally extending portions extending to and merging into said spring seat portions, strut members extending between said upper and lower members from beneath said center bearing to points substantially at the junction of the diagonal and horizontal central portions of said lower member, brace members between said upper and lower members substantially beneath said side bearings, and ribs formed integral with said upper member on each side of said center bearing, said ribs extending from near said center bearing to near said side bearings.

18. In a bolster having a center bearing, side bearings and spring seats, the combination of upper, lower and side members forming a substantial box girder construction, said lower member including a straight horizontal portion substantially below said center bearing and straight diagonally extending portions extending to and merging into said spring seat portions, strut members extending between said upper and lower members from beneath said center bearing to points substantially at the intersection of said diagonal and horizontal central portions of said lower member, brace members extending between said upper and lower members beneath said side bearings, said brace members having extensions formed integral with said upper member and extending toward and terminating near said center bearing.

19. In a bolster having a center bearing, the combination of spaced upper and lower members, said lower member including a horizontal substantially straight portion substantially below said center bearing, and diagonally extending portions continuing outwardly from said horizontal portion, and strut members extending between said upper and lower members from points on the upper member within the periphery of said center bearing and sloping outwardly and downwardly to points substantially at the intersection of the diagonal portions with the horizontal portion of said lower member.

20. In a bolster having a center bearing, the combination of spaced upper and lower members, said lower member including a horizontal substantially straight portion substantially below said center bearing, and diagonally extending portions continuing outwardly from said horizontal portion, and strut members extending between said upper and lower members from points on the upper member within the periphery of said center bearing and sloping outwardly and downwardly to points substantially at the intersection of the diagonal portions with the horizontal portion of said lower member, said strut members being substantially semi-circular in section.

21. In a bolster having a center bearing, side bearings and spring seats, the combination of upper, lower and side members forming a substantial box girder construction, said lower member including a horizontal substantially straight portion substantially below said center bearing, and diagonally extending portions continuing outwardly from said horizontal portion and extending to and merging into said spring seats, strut members extending between said upper and lower members from points beneath and within the periphery of the center bearing and sloping outwardly and downwardly to points substantially at the intersection of said diagonal portions and said horizontal central portion of the lower member, and brace members extending between said upper and lower members substantially beneath said side bearings.

22. In a bolster having a center bearing, side bearings and spring seats, the combination of upper, lower and side members forming a substantial box girder construction, said lower member including a horizontally substantially straight portion substantially below said center bearing, and diagonally extending portions continuing outwardly from said horizontal portion, and extending to and merging into said spring seats, strut members extending between said upper and lower members from points beneath and within the periphery of the center bearing and sloping outwardly and downwardly to points substantially at the intersection of said diagonal portions and said horizontal central portion of the lower member, and brace members extending between said upper and lower members substantially beneath said side bearings, said brace members having portions extending inwardly toward said center bearing and terminating adjacent said center bearing.

23. In a bolster having a center bearing, side bearings and spring seats, the combination of spaced upper and lower members, said lower member including a progression of substantially straight portions of different angularity one of which is diagonally disposed with respect to another and forms substantially an abrupt angle therewith, and a center post including spaced struts connecting said upper and lower members, said struts merging into said lower member substantially at the apex of said angle.

24. In a bolster having a center bearing, side bearings and spring seats, the combination of spaced upper and lower members, strut members extending between said upper and lower members substantially beneath said center bearing, brace members extending between said upper and lower members substantially beneath said side bearings, said lower member including a progression of substantially straight portions of differing angularity, said angularity changing at substantially the points of junction of said lower member with said strut members, brace members and spring seats.

25. In a bolster having a center bearing, side bearings and spring seats, the combination of spaced upper and lower members, strut members extending between said upper and lower members substantially beneath said center bearing, brace members extending between said upper and lower members substantially beneath said side bearings, said brace members having rib portions extending to points adjacent said center bearing, said lower member including a progression of substantially straight portions of differing angularity, said angularity changing at substantially the points of junction of said lower member with said strut members, brace members and spring seats.

26. In a bolster having a center bearing, side bearings and spring seats, the combination of spaced upper and lower members, side members formed with said upper and lower members forming a substantial box girder construction, strut members extending between said upper and lower members substantially beneath said center bearing, brace members extending between said upper and lower members substantially beneath said side bearings, said lower member including a progression of substantially straight portions of differing angularity, said angularity changing at substantially the points of junction of said lower member with said strut members, brace members and spring seats.

27. In a bolster having a center bearing, side bearings and spring seats, the combination of spaced upper and lower members, side members formed with said upper and lower members forming a substantial box girder construction, strut members extending between said upper and lower members substantially beneath said center bearing, brace members extending between said upper and lower members substantially beneath said side bearings, ribs formed integral with said upper member and extending from points adjacent said side bearings to adjacent said center bearing, said lower member including a progression of substantially straight portions of differing angularity, said angularity changing at substantially the points of junction of said lower member with said strut members, brace members and spring seats.

28. In a bolster having a center bearing, the combination of upper, lower and side members forming a substantial box girder construction, and strut members extending between said upper and lower members from points on the upper member within the periphery of said center bearing and sloping outwardly and downwardly to points on said lower member.

29. In a bolster having a center bearing, the combination of upper, lower and side members forming a substantial box girder construction, and strut members extending between said upper and lower members from points on the upper member within the periphery of said center bearing and sloping outwardly and downwardly to points on said lower member, and a portion connecting said strut members intermediate said upper and lower member.

30. In a bolster having a center bearing, side bearings and spring seats, the combination of spaced upper and lower members, said lower member including a straight portion substantially below said center bearing, and straight diagonally extending portions forming substantially an abrupt angle with said first named portion and extending to and merging into said spring seat portions, and strut members extending between said upper and lower members at points beneath the periphery of said center bearing and merging into said tension member substantially in the apex of said angle, said strut members being spaced inwardly from the vertical planes of the side edges of one of said first named members.

31. In a bolster, the combination of spaced upper and lower members and connecting side members forming substantially a box section, a center bearing disposed on said bolster, and brace members between said upper and lower members and spaced from said center bearing, said brace members having portions extending toward and terminating adjacent said center bearing.

32. In a bolster, the combination of spaced upper and lower members and connecting side members forming substantially a box section, a center bearing disposed on said bolster, and brace members between said upper and lower members and spaced from said center bearing, said brace members having portions extending diagonally toward and terminating adjacent said center bearing.

33. In a bolster, the combination of spaced upper and lower members and connecting side members forming substantially a box section, a center bearing disposed on said bolster, and brace members between said upper and lower members and spaced from said center bearing, said brace members having portions extending and varying in depth toward said center bearing and terminating adjacent thereto.

34. In a bolster, the combination of spaced upper and lower members and connecting side members forming substantially a box section, a center bearing disposed on said bolster, and brace members between said upper and lower members and spaced from said center bearing, said brace members having portions integral with said upper member and extending toward and terminating adjacent said center bearing.

35. In a bolster, the combination of spaced upper and lower members, a center bearing disposed on said bolster, and brace members substantially semi-circular in section between said upper and lower members, said brace members having rib portions extending toward and terminating adjacent said center bearing.

36. In a bolster, the combination of spaced upper and lower members, a center bearing disposed on said bolster, and brace members substantially semi-circular in section between said upper and lower members, said brace members having rib portions integral with said upper member extending toward and terminating adjacent said center bearing.

37. In a bolster, the combination of spaced upper and lower members, a center bearing disposed on said bolster, and brace members substantially semi-circular in section between said upper and lower members, said brace members having rib portions extending and varying in depth toward said center bearing and terminating adjacent thereto.

38. In a bolster, the combination of spaced upper and lower members and connecting side members forming substantially a box section, a center bearing disposed on said bolster, brace members between said upper and lower members and spaced from said center bearing and having portions extending toward and terminating adjacent said center bearing, and strut members extending between said upper and lower members and having a portion disposed beneath the periphery of said center bearing.

39. In a bolster having a center bearing, the combination of upper, lower and side members forming a substantial box girder construction, brace members between said upper and lower members and spaced from said center bearing and having portions extending toward and terminating adjacent said center bearing, and strut members extending between said upper and lower members and having a portion disposed beneath the periphery of said center bearing.

40. In a bolster, the combination of spaced upper and lower members, a center bearing disposed on said bolster, brace members between said upper and lower members and spaced from said center bearing and having portions extending toward and terminating adjacent said center bearing, strut members extending between said upper and lower members and having a portion disposed beneath the periphery of said center bearing, said strut members being substantially semi-circular in section.

41. In a bolster having a center bearing, side bearings and spring seats, the combination of upper, lower and side members forming a substantial box girder construction, brace members between said upper and lower members and spaced from said center bearing and having portions extending toward and terminating adjacent said center bearing, strut members extending between said upper and lower members and having a portion disposed beneath the periphery of said center bearing, and brace members extending between said upper and lower members substantially beneath said side bearings.

42. In a bolster having a center bearing, side bearings and spring seats, the combination of upper and lower members, strut members below said center bearing and between said upper and lower members, brace members adjacent said side bearings between said upper and lower members, said brace members having portions extending toward and terminating adjacent said center bearing, and rib members extending between said upper and lower members and adjacent said spring seats.

43. In a bolster having a center bearing, side bearings and spring seats, the combination of upper and lower members, strut members below said center bearing and between said upper and lower members, brace members adjacent said side bearings between said upper and lower members, said brace members having portions extending toward and terminating adjacent said center bearing, and diagonally disposed rib members extending between said upper and lower members and adjacent said spring seats.

44. In a bolster having a center bearing, side bearings and spring seats, the combination of upper and lower members, strut members below said center bearing and between said upper and lower members, brace members adjacent said side bearings between said upper and lower members, said brace members having portions extending toward and terminating adjacent said center bearing, and diagonally disposed rib members extending between said upper and lower members and having a portion terminating below said side bearings.

45. A car truck bolster of hollow form, provided at its medial portion with an internal center post, opposite walls of said post diverging downwardly from the top to the bottom of the bolster.

46. A car truck bolster of hollow form, provided at its medial portion with an internal center post, opposite walls of said post diverging downwardly from the top to the bottom of the bolster, and a king-pin seat arranged in said post and joining opposite sides of the same.

47. A hollow cast metal car truck bolster, provided at its medial portion with an internal hollow center post, said post having its upper end connected to the top of the bolster, and its lower end united with the bottom of the bolster, said center post flaring downwardly.

48. A hollow cast metal car truck bolster, provided at its medial portion with an internal hollow center post, said post having its upper end connected to the top of the bolster, and its lower end united with the bottom of the bolster, said center post flaring downwardly, and a king-pin seat arranged within the post and having its ends merging into opposite sides of the post.

49. A car truck bolster of hollow form having an internal downwardly flaring center post merging at its ends into the top and bottom of the bolster, said bolster having openings in its top and bottom arranged between the center post and the end of the bolster, and internal reinforcements within the bolster for reinforcing the portions of the top and bottom where said openings are located.

50. A hollow bolster of box cross section throughout substantially its entire length and provided at the medial portion of its top with a center plate, channel-shaped compression members diverging downwardly from the top to the bottom of the bolster, depending flanges projecting downwardly from the under side of the center plate and having their ends merging into the sides of said compression members, a kingpin bridge tying the medial portions of the flanges together, the interior of the bolster between said bridge and the bottom being unobstructed.

51. A car truck bolster having a hollow end portion of box cross section provided internally with a series of vertically disposed inclined truss elements which merge into the top and bottom of the bolster.

52. A car truck bolster of hollow form, having an internal downwardly flaring center post merging at its ends into the top and bottom of the bolster, said bolster having openings in its top and bottom arranged between the center post and the end of the bolster, and internal reinforcements within the bolster for reinforcing the portions of the top and bottom where said openings are located, said reinforcements including internal flanges surrounding certain of the openings.

53. A car truck bolster of hollow form, having an internal downwardly flaring center post merging at its ends into the top and bottom of the bolster, said bolster having openings in its top and bottom arranged between the center post and the end of the bolster, and internal reinforcements within the bolster for reinforcing the portions of the top and bottom where said openings are located.

WILLIAM C. HEDGCOCK.
ROBERT B. COTTRELL.